C. T. BEECHER.
Harness Whiffletrees.
No. 145,043. Patented Dec. 2, 1873.
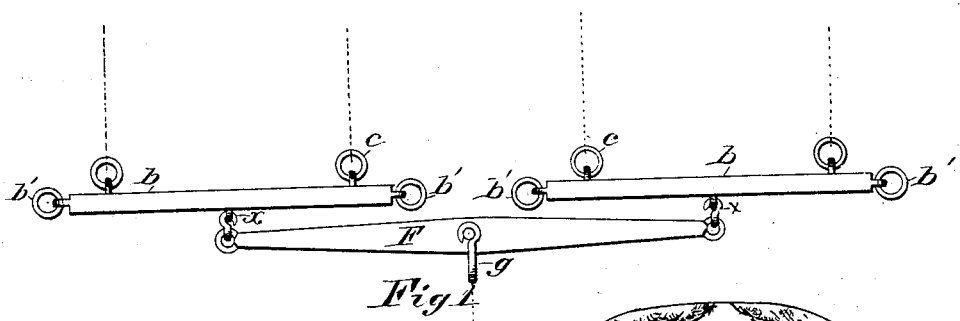
Fig 1
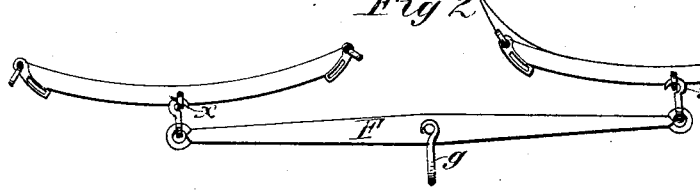
Fig 2
Fig 3
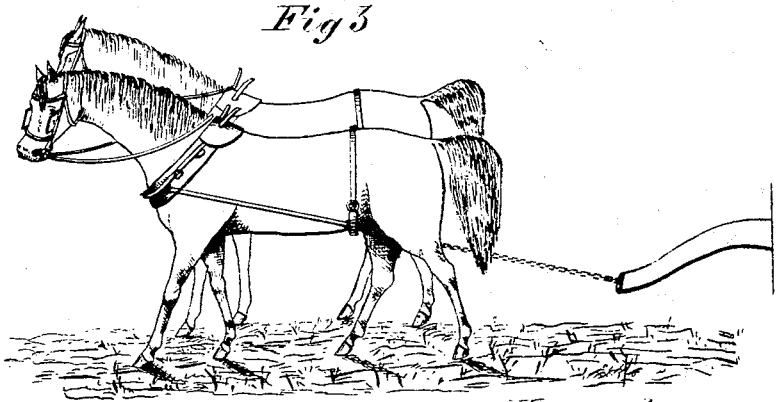
Witnesses:
H. E. Clark
Fred. K. Swett
Inventor:
C. T. Beecher
by Dyer, Beadle & Atty's

UNITED STATES PATENT OFFICE.

CHAUNCEY T. BEECHER, OF BETHANY, CONNECTICUT.

IMPROVEMENT IN HARNESS-WHIFFLETREES.

Specification forming part of Letters Patent No. 145,043, dated December 2, 1873; application filed May 5, 1871.

*To all whom it may concern:*

Be it known that I, CHAUNCEY T. BEECHER, of Bethany, in the county of New Haven and State of Connecticut, have invented certain Improvements in Whiffletrees and Eveners, of which the following is a specification:

This invention is designed to supersede the ordinary whiffletree-gear; and consists mainly in the combination of certain whiffletrees of peculiar construction with a double-tree, the parts being united by loose connections, consisting of a link or hook, as will be fully described hereinafter.

In the drawings, Figure 1 represents a plan view of my improvement, and Fig. 2 a side elevation of the same.

To enable others skilled in the art to make and use my invention, I will now proceed to describe the construction and mode of operation of the same.

$b$ $b$ represent whiffletrees, preferably curved upward from the center, as shown in Fig. 2, to approximate to the outline of a horse's belly, which are provided at each end with rings $b'$ $b'$, adapted to receive supporting bands or straps passing over the horse's back, and upon their front sides with rings $c$ $c$, adapted to receive the draft-straps attached to the hames or breast-collar. F represents the double-tree, provided in the center with a clevis, $g$, to which the draft-chain is attached, and at each end with an eye, by means of which it is connected to the link or hook $x$ attached to the central bolt of the whiffletree $b$ $b$.

The manner of using my invention is as follows: The single-trees are suspended beneath the horses' bellies by means of proper supporting-straps, which rest upon the back of the horse, as shown at $a$, Fig. 2. The draft-straps, which are attached to the hames in front, are united in rear to the rings $c$ $c$. The draft-chain is attached to the clevis $g$, and extends rearward between the horses. Care should be taken to locate the supporting-straps upon the horse's back in such position forward or backward that the single-trees will be properly supported in the line of draft extending from the point of attachment at the hames to the point of resistance at the plow or vehicle, and not above or below it, so as to bring the strain improperly upon the horse's back or against his belly.

The employment of a loose connection between the parts is advantageous, because by means of it they are adapted to readily adjust themselves to the line of draft without danger of twisting out of place, the link or hook serving as a universal joint between the whiffletrees and double-trees. The accomplishment of this result will be better understood, perhaps, by an inspection of Figs. 1 and 3, in which dotted lines represent the line of the draft-straps, the connecting parts, and the draft-chain, all of which, it will be observed, lie in the same plane.

The whiffletrees do not project beyond the horses, so that the team may be driven close to tender plants or other objects without fear of injuring them. The construction is so very simple that the cost is small.

Having thus described my invention, what I claim, and desire to secure by Letters Patent of the United States, is—

The combination of the whiffletrees $b$, having rings $c$ $c$ and central bolt, with the double-trees and the universally-jointed hook or link $x$, substantially as described.

CHAUNCEY T. BEECHER.

Witnesses:
FRANK M. LOVEJOY,
FRED. W. STEVENS.